3,310,547
CATALYSTS OF TRANSITION METAL BORO-
HYDRIDE COMPLEXES

Stanley B. Mirviss, Westfield, Herbert W. Dougherty, Jr., Cranford, and Ralph W. Looney, East Orange, N.J., assignors to Esso Research and Engineering Company, a corporation of Delaware
No Drawing. Filed June 7, 1961, Ser. No. 115,315
14 Claims. (Cl. 260—93.7)

This invention relates to transition metal borohydride complexes and their use alone or with auxiliary materials for the polymerization of olefins.

The low pressure catalytic process for the preparation of linear polymers from alpha olefins with transition metal compounds with or without reducing metal-containing compounds is well known. The process with a reducing metal-containing compound is generally described in the literature, e.g., see "Scientific American," September 1957, pages 98 et seq. It is desirable to make other catalysts available so as to insure greater flexibility in the types of products that can be prepared.

It has now surprisingly been found that transition metal borohydride complexes, by themselves, are effective olefin polymerization catalysts. It is also surprising that these catalysts without additional components will also dimerize olefins. These phenomena are in sharp contrast to $Ti(OR)_4$ type materials which need an aluminum alkyl to polymerize and dimerize only ethylene and in contrast to transition metal halides and other compounds which need aluminum alkyls to polymerize and which do not dimerize olefins. With other additional catalyst components, the nature of the products obtained and ratio of dimerization to higher polymerization can be selectively affected. It is particularly surprising that the transition metal borohydride complexes work as effectively as they do since they give superior yields to the uncomplexed borohydride materials and also they respond differently to the presence of auxiliary catalyst components. Further details follow.

The transition metal borohydrides are those of Groups IV-B, V-B and VI-B of the Periodic Table with titanium, chromium and vanadium particularly preferred. These borohydrides are complexed with Group V-A or VI-A elements, e.g., O, S, P, N, As, Sb, etc., containing compounds such as tetrahydrofuran (hereinafter referred to as THF), hexamethylphosphoramide (HMPA), 1,4-dioxane, phosphorous, arsenic, antimony and bismuth alkyls and aryls or mixed alkyls and aryls, such as $(Butyl)_3P$, $(Phenyl)_3As$, or $(Octyl)_3Bi$. Pyridine, quinaldine, lutidines, pyrrolidine, triethylamine, quinoline, pyrrole, thiophene, tetrahydropyran, tetrahydrothiophene, tributylphosphate, diphenyl ether, anisole, dimethylaniline, etc. are examples of other complexing materials. These materials are, in general, characterized by having a central atom which contains at least one pair of valence electrons which is not shared with another atom in the molecule. The transition metal compound borohydrides can be utilized in a variety of valence forms to give different types of catalyst activities as will be demonstrated below. Some of the transition metal borohydrides can be prepared by reacting the transition metal chloride with an alkali metal borohydride in the presence of the complexing agent. Alternatively, much purer transition metal borohydride complexes can be prepared more readily by the method in "Journal of the Electrochemical Society," volume 104, page 26 (1957).

The complexes of this invention are effective for the homopolymerization and copolymerization of diolefins such as butadiene, isoprene, divinylbenzene, piperylene, etc., as well as homopolymerization or copolymerization and dimerization and codimerization of alpha olefins such as ethylene, propylene, 1-butene, etc. Thus, dependent on the conditions, the complexing agent, the valence of the transition metal, and the particular olefins used, the polymerization can proceed to solid linear polymers or go selectively in the direction of dimers almost exclusively, e.g., from ethylene to 1-butene or to mixtures of solid polymer and dimers. It is to be understood that the term "polymerization" connotes any or all of these types of reactions with the term "olefins" connoting both mono- and diolefins.

The activity and selectivity of the complexes can also be affected by the use of aluminum alkyl compounds, e.g., those corresponding to the formula $RR'AlX$. In this formula, R, R' and X preferably are alkyl groups of 2 to 8 carbon atoms, although X may alternatively be hydrogen or halogen, notably chlorine. Typical examples of the aluminum alkyl compounds are aluminum triethyl, methyl aluminum sesquichloride, aluminum triisobutyl, etc. The molar ratio of these materials to the transition metal complex can be in the range of 0.1–10/1. This modification of catalyst activity is, however, not what would ordinarily have been expected from so-called Ziegler catalysis. Thus, the use of aluminum triethyl with the THF titanium complex in the polymerization of ethylene reduces the selectivity to solid polymer and increases that to 1-butene and total product yield. Conversely, the addition to this system of $CCl_4$ gives an almost quantitative conversion to solid polymer. The use of Group V-A organometallics such as tributylstibine, trimethylarsine, triphenylbismuthine, or trihexylphosphine with the borohydrides can also be used to alter the selectivity and a very active catalyst results.

The vanadium borohydride-hexamethylphosphoramide complex on the other hand gives an almost quantitative conversion of ethylene to solid polymer. The antimony alkyl system gives a solid polypropylene. The almost infinite variety and flexibility of the catalysts of this invention is thus apparent.

In general, the polymers are prepared by contacting the olefins with the resulting catalyst in the presence of organic solvents such as isopentane, n-heptane, xylene, ethers, chlorinated aromatics, etc. Some of the catalysts of the invention are soluble in these solvents including the paraffinic hydrocarbons such as heptane in contrast to the conventional low pressure activated transition metal compound catalysts. The polymerization is conveniently effected at temperatures of about $-10°$ to $150°$ C. and pressures ranging from about 0 to 3,000 p.s.i.g., usually 100–2,000 p.s.i.g. The catalyst concentration in the polymerization zone is preferably in the range of about 0.01 to 10 g./liter based on the total liquid and the polymer product concentration in the polymerization zone is preferably kept between about 2 to 15% based on total contents so as to allow easy handling of the polymerization mixture. Gaseous dimeric olefinic products can be periodically removed from the reactor by venting and gaseous monomeric olefins are returned if desired. The proper polymer concentration can be obtained by having enough of the inert diluent present or by stopping the polymerization short of 100% conversion. When the desired degree of polymerization has been reached, a $C_1$ to $C_8$ alkanol such as isopropyl alcohol or n-butyl alcohol, is normally added to the reaction mixture for the purpose of dissolving and deactivating the catalyst and for precipitating the polymer product from solution. After filtration, the solid polymer may be further washed with alcohol or acid such as hydrochloric acid, with or without a chelation agent such as acetylacetone, dried, compacted and packaged.

This invention and its advantages will be better understood by reference to the following examples.

EXAMPLE 1.—PREPARATION OF TITANIUM TRIBOROHYDRIDE-TETRAHYDROFURANATES

Titanium borohydride was prepared from titanium tetraisopropylate and diborane in the presence of a complexing diluent, tetrahydrofuran (THF), as illustrated in the equation below. The titanium is reduced from the +4 valence state to the +3 state.

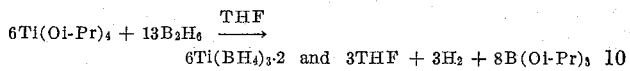

$$6Ti(Oi\text{-}Pr)_4 + 13B_2H_6 \xrightarrow{THF}$$
$$6Ti(BH_4)_3 \cdot 2 \text{ and } 3THF + 3H_2 + 8B(Oi\text{-}Pr)_3$$

The borohydride was isolated as the 2THF complex (blue crystals) and as the 3THF complex (reddish violet crystals). The 2 and 3THF complexes were the only isolable titanium compounds in the reaction mixture. They are soluble in n-heptane and other hydrocarbons such as xylene, benzene, and still more soluble in ethers such as diethyl ether. THF is an excellent solvent. The 2THF complex when freshly prepared is inflammable in air and burns with a green flame while the 3THF complex smokes in air. It is interesting to note that the complexed materials are soluble in heptane whereas the uncomplexed borohydride, prepared by the method of the J. Am. Chem. Soc., vol. 71, 2488 (1949), is insoluble.

EXAMPLE 2.—POLYMERIZATION OF ETHYLENE WITH THE CATALYST OF EXAMPLE 1

By the use of the catalyst materials of Example 1, a substantial yield of solid ethylene polymer and butene-1 with low yields of olefins greater than $C_4$ were obtained. When $AlEt_3$ was used as a cocatalyst, the catalyst efficiency to solid polymer was decreased but the catalyst efficiency to butene-1 was markedly increased. Better catalyst efficiencies were obtained with the $$Ti(BH_4)_3 \cdot 3THF$$

than with the 2THF complex as seen in the table.

ETHYLENE POLYMERIZED WITH $Ti(BH_4)_3 \cdot 2$ and 3THF (USED IN EQUIMOLAR QUANTITIES)

| Catalyst | Cat. Eff., g./g. (n-Heptane, 80° C.; 500 p.s.i.g.) | | | |
|---|---|---|---|---|
| | No AlEt₃ | | With AlEt₃ (1/1, Al/Ti) | |
| | 1-Butene | Solid | 1-Butene | Solid |
| $Ti(BH_4)_3 \cdot 2THF$ | 6 | 15 | 68 | 9 |
| $Ti(BH_4)_3 \cdot 3THF$ | 15 | 20 | 50 | 14 |

The polymerization and dimerization activity of the $Ti(BH_4)_3$ complex is surprising in view of the inactivity of $TiCl_3$ alone or $TiCl_3$–THF complexes, e.g., a green crystalline $TiCl_3 \cdot 3THF$, which has been prepared also and found to be inactive. The titanium halides, even with aluminum alkyl cocatalyst will not dimerize ethylene. Titanium tetraalcoholates only dimerize ethylene with an aluminum alkyl cocatalyst and do not dimerize propylene.

The runs which gave the highest 1-butene yields gave the lowest molecular weight, highest $CH_3$ content according to infrared analysis, and lowest density polymer. Hence, 1-butene is copolymerized with the ethylene. The 1-butene yields are markedly increased by an $AlEt_3$ cocatalyst and somewhat increased by use of the 3THF catalyst instead of the 2THF catalysts. The effects of an $AlEt_3$ cocatalyst on 2 vs. 3THF complexes on polymer properties are illustrated by the table below.

EFFECT OF CATALYST SYSTEM ON POLYMER PROPERTIES

| Polymer Property | 3 Instead of 2 THF | AlEt₃ Cocatalyst |
|---|---|---|
| Density | Lowered | Increased. |
| Mol. wt | do | Lowered. |
| CH₃ content | Increased | Increased. |
| Amount 1-butene in polymer | do | Do. |

It is thus seen that it is possible to inherently obtain a copolymer of ethylene and 1-butene with a feed consisting solely of ethylene. Similar results are, of course, obtained with a mixed feed. The copolymer composition can be varied in the manner shown in the above table.

The 1-butene purity was found to be >94 wt. percent pure. The major impurities were cis and trans 2-butene (trans > cis) with minor impurities of n-butane, n-hexane and trace amounts of 1-hexene and 1-octene.

EXAMPLE 3.—ETHYLENE-PROPYLENE MIXED FEED COPOLIMERIZED AND CODIMERIZED $Ti(BH_4)_3 \cdot 2$ and 3THF complexes cocatalyzed with $AlEt_3$ polymerized a 50:50 (by weight) mixture of ethylene and propylene to solid copolymer in 6 g./g. catalyst efficiency. The solid polymer had moderately high density, very high melting point, and low to medium molecular weight as illustrated in the table below. Complete data is given in the table below. The methyl group content indicates that copolymerization took place. As in the case with the ethylene-butene-1 system above, the 3THF complex gave the lowest molecular weight and highest $CH_3$ content, i.e., the greatest propylene content in the copolymer similar to the greatest butene-1 content in Example 2.

ETHYLENE-PROPYLENE COPOLYMER PROPERTIES

| Polymer Properties | $Ti(BH_4)_3$-THF Complexes with AlEt₃ (1/1, Al/Ti) | |
|---|---|---|
| | 2 THF | 3 THF |
| Molecular weight ×10³ | 490 | 145 |
| Density [1] | 0.938 | 0.938 |
| Melting Point, °C | 152 | 141 |
| CH₃ Groups/100 CH₂[2] | 0.5 | 1.3 |
| Melt Index at 250° C | 0.13 | 7.13 |

[1] Unannealed samples.
[2] Determined by infrared.

Not only was solid polymer formed, but also large quantities of dimer and codimer olefins, especially butene-1 as shown in the table below. The propylene dimer and ethylene-propylene codimer have a 2-methyl pentyl and 2-methyl butyl structure respectively. These characteristics make these olefins very desirable as isoprene precursors by dehydrogenation and cracking; as synthetic intermediates and for use in preparation of fibers.

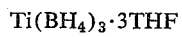

$Ti(BH_4)_3$ DIMERIZES $C_2H_4$–$C_3H_6$ FEED

| Olefins | Cocatalyst Efficiencies with AlEt₃ Cocatalyst [1] | |
|---|---|---|
| | $Ti(BH_4)_3 \cdot 2THF$ | $Ti(BH_4)_3 \cdot 3THF$ |
| $C_4^=$ | 29.0 | 49.0 |
| $C_5^=$ | 2.5 | 4.5 |
| $C_6^=$ | 2.5 | 4 |

[1] 1;1, Al₃Ti mole ratio. Runs made at 80° C. and with a 50=50 wt. % $C_2H_4$–$C_3H_6$ feed (500–600 p.s.i.g.) in n-heptane diluent.

EXAMPLE 4.—DIOLEFINS POLYMERIZED BY $Ti(BH_4)_3 \cdot 2THF$ $Ti(BH_4)_3 \cdot 2THF$ with an $AlEt_3$ cocatalyst (1/1, Al/Ti) completely polymerized butadiene (100% conversion). No dimers or trimers were obtained in contrast with the results with ethylene and propylene. The products consisted of 30% benzene soluble polymer and 70% benzene insoluble polymer with a catalyst efficiency of 22 g./g. Higher catalyst efficiencies can be obtained if more butadiene is used in lieu of the 100% conversion. In such a situation of excess butadiene, most of the total polymer formed is soluble polymer. The soluble polymer is typical of the polybutadiene obtained by sodium or Alfin catalysis and infrared showed that it was formed by 60% 1,2, 18% cis-1,4 and 17% trans-1,4 polymerization.

EXAMPLE 5.—EFFECT OF CCl$_4$

In contrast to the use of aluminum triethyl alone as an auxiliary catalyst component, the addition of CCl$_4$ results in high catalyst efficiencies to solid polyethylene without butene-1 formation. Thus, a catalyst efficiency of 30 g./g. of solid polymer of excellent properties was obtained using a Ti(BH$_4$)$_3$·3THF–AlEt$_3$ (3/1, Al/Ti mole ratio) catalyst system with CCl$_4$. A catalyst efficiency of 46 g./g. is obtained with a 1/1 mole ratio of Al/Ti. Only 9–14 g./g. of solid polymer were obtained without CCl$_4$ present (1/1, Al/Ti), but the simultaneous formation of butene-1 in 50–68 g./g. efficiency should not be overlooked. With a CCl$_4$ or CHCl$_3$–Ti(BH$_4$)$_3$·3THF system, no AlEt$_3$, there is no polymerization activity with ethylene.

EXAMPLE 6.—EFFECT OF TITANIUM VALENCE STATES

The effect of titanium valence states for aluminum triethyl co-catalysis in the polymerization of ethylene is demonstrated below:

TABLE I.—Ti(BH$_4$)$_2$·1THF IS MORE ACTIVE THAN Ti(BH$_4$)$_3$·2 OR 3THF FOR SOLID POLYMER BUT NOT FOR BUTENE

[Run at 80° C.; 500–750 p.s.i.g.; n-heptane (diluent)]

| Catalyst | Catalyst Conc., Moles Catalyst ×10³/30 ml. n-heptane dil. | Catalyst Efficiency, Solid Polymer g./g. of Cat. | Butene [1] | Polymer Molecular Wt. ×10³ |
|---|---|---|---|---|
| Ti(BH$_4$)$_2$·1THF | 6.15 | 29.4 | 15.2 | 685 |
| Ti(BH$_4$)$_2$·1THF | 3.07 | 39.2 | 17.8 | 1,100 |
| Ti(BH$_4$)$_3$·2THF | 5.70 | 14.8 | 5.9 | 1,700 |
| Ti(BH$_4$)$_3$·3THF | 6.35 | 20.4 | 15.3 | 920 |

[1] >97% pure 1-butene; rest 2-butene.

Ti(BH$_4$)$_2$·1THF gives almost the same activity with C$_2$H$_4$ to solid polymer as without AlEt$_3$ present but much less butene is formed when AlEt$_3$ is present as shown in Table II.

TABLE II.—MUCH LESS BUTENE WITH AlEt$_3$ COCATALYSIS

[1/1, Al/Ti mole ratio; 80° C.; 400–600 p.s.i.g.; n-heptane diluent]

| Catalyst (AlEt$_3$ Cocatalyst) | Total Catalyst Efficiency, Solid Polymer g./g. of Cat. | Butene [1] | Polymer Molecular Wt. ×10³ |
|---|---|---|---|
| Ti(BH$_4$)$_2$·1THF | 31.1 | 4.9 | 1,300 |
| Ti(BH$_4$)$_3$·2THF | 8.5 | 68.2 | 1,500 |
| Ti(BH$_4$)$_3$·3THF | 13.6 | 50.0 | 85 |

[1] 94% 1-butene; rest 2-butene.

EXAMPLE 7.—TITANIUM BOROHYDRIDE–[(CH$_3$)$_2$N]$_3$PO

The catalyst, Ti(BH$_4$)$_3$·3[(CH$_3$)$_2$N]$_3$PO, was prepared by passing diborane through a solution composed of 37.4 g. of Ti(OC$_3$H$_7$)$_4$ and 81 g. of [(CH$_3$)$_2$N]$_3$PO. The reaction mixture was maintained at a temperature between 17° and 29° C. The blue, crystalline product was recovered in good yield by filtration after allowing the reaction mixture to stand overnight and then washed with n-C$_7$H$_{16}$.

Dimerization of ethylene

A bomb was charged with 1 g. of catalyst, 3 ml. of n-C$_7$H$_{16}$ and pressurized to 500 p.s.i.g. with ethylene. The bomb was heated to 100° C. and maintained at this temperature for approximately 4 hours with constant rocking. The products were 17.1 g. of dimer (essentially 1-butene) and a trace (<0.1 g.) of solid polymer.

Thus, by changing the ligand from THF to HMPA, a catalyst which is solely an olefin dimerization catalyst is obtained. Other variations can be obtained by other changes in ligand.

EXAMPLE 8.—TITANIUM BOROHYDRIDE DIOXANE CATALYST

The catalyst,

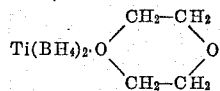

was prepared by bubbling diborane into a solution of 37.4 g. of Ti(OC$_3$H$_7$)$_4$ and 85 ml. of 1,4-dioxane maintained at a temperature of 5 to 12° C. The reaction mixture was evaporated to dryness and the residue dissolved in 1,4-doxane and methylcyclohexane. This solution was evaporated to dryness to give the product.

Polymerization of ethylene

A bomb was charged with 1 g. of catalyst, 30 ml. of n-C$_7$H$_{16}$ and pressurized to 500 p.s.i.g. with ethylene. The temperature of the bomb was increased to 80° C. with shaking and polymerization occurred. After 6½ hours the products were 5.1 g. of dimer and 16.2 g. of solid polymer.

EXAMPLE 9.—TITANIUM BOROHYDRIDE (BUTYL)$_3$P CATALYST 5 g. of Ti(BH$_4$)$_3$·2THF was treated with stirring with 17.2 g. of (Bu)$_3$P (a 4/1, P/Ti mole ratio) in solution in 40 ml. of dry diethyl ether under nitrogen. The solution was stirred at room temperature overnight and then stripped under high vacuum with heating until the excess Bu$_3$P had been stripped off with a pot temperature of 60° C. and vacuum of 0.4 mm. Hg.

Polymerization 1.0 g. of the above residue was added to a 300 ml. bomb and diluted with 30 ml. of dry n-heptane. The bomb was then pressured to 500 p.s.i.g. with ethylene, rocked, and heated to 105° C. in 2 hours and then the temperature kept at 100° C. for 3 hours. The bomb was then cooled and vented through Dry Ice traps and no butenes were obtained. The contents of the bomb were then filtered and the polymer washed with methanol and dried. It had a weight of 4 g. and had a molecular weight of 2,500,000. Hence, by variation of the ligand, one can go from only dimer to only solid polymer.

EXAMPLE 10.—Ti(BH)–Bu$_3$Sb CATALYST

Catalyst preparation same as for Example 9 except using 5.0 g. of Ti(BH$_4$)$_3$·3THF and 24.8 g. of (Bu)$_3$Sb (a 5/1, Sb/Ti mole ratio) in solution in 60 ml. of ether. After stirring overnight, the reaction mixture was stripped under vacuum for several hours at 50–55° C. and 0.4–0.8 mm. Hg. Much of the THF and all of the ether could be removed in this way but none of the excess Bu$_3$Sb. The black liquid resdiue was used as a catalyst per se.

Polymerization—Ethylene 2 g. of the above solution of the titanium borohydride-Bu$_3$Sb in excess Bu$_3$Sb was used as a catalyst as in Example 9 with ethylene, and 19 g. of solid polyethylene and 7 g. of butenes were obtained from the polymerization after workup in the usual manner.

*Polymerization—Propylene*

Same as for ethylene except that 50 g. of propylene was used instead of the ethylene. The temperature was brought up to 80° C. in 5 hours polymerization time and kept at 80° C. for 1 hour and then the bomb was cooled, vented, and emptied. 2 g. of a solid polymer was so obtained after washing with methanol, dilute HCl, methanol and then drying.

In a similar manner Bi(Bu)$_3$ was employed for similar results.

EXAMPLE 11.—VANADIUM BOROHYDRIDE-HEXAMETHYLPHOSPHORAMIDE CATALYST 47.1 g. of VCl$_3$ (anhydrous) (0.3 mole) was dissolved in 300 ml. of methanol and then treated with 20.7 g. of sodium (0.90 mole) in 300 ml. of methanol with stirring and external cooling. The alcohol was then completely stripped off under vacuum from the pale green solid residue of V(OCH$_3$)$_3$ and NaCl. The V(OCH$_3$)$_3$ cannot be separated at this stage from the NaCl because of common insolubility in methanol. The V(OCH$_3$)$_3$ residue was partly dissolved and suspended in 200 ml. of hexamethylphosphoramide. Then B$_2$H$_6$ was swept in with stirring with the aid of nitrogen slowly from a B$_2$H$_6$ generator using 25 g. of sodium borohydride (0.672 mole) in 100 ml. of diglyme (dimethyl ether of diethyleneglycol) to which was added slowly dropwise 130 g. of boron trifluoride etherate (0.913 mole). After the reaction was over, the NaCl was filtered off, and then the filtrate was cooled and a dark green precipitate formed which was filtered off.

*Polymerization*

A 300 ml. bomb was charged with 1 g. of the above, V(BH$_4$)(OCH$_3$)$_2$·5[(CH$_3$)$_2$N]$_3$PO, and 30 ml. of dry n-heptane and the bomb pressured to 500 p.s.i.g. with ethylene with rocking. After 20 min. the bomb was heated to 100° C. over a period of one hour and the temperature maintained at 100° C. for three hours and then the bomb was cooled and vented through Dry Ice traps. No butenes were obtained in the venting and the contents of the vented bomb were then filtered and the solid polyethylene washed with methanol and dried. It had a weight of 7 g. and a molecular weight of about 2,000,000 (inherent viscosity of 13.3).

EXAMPLE 12.—CHROMIUM BOROHYDRIDE THF CATALYST

A slurry of 47.4 g. of CrCl$_3$ (0.3 mole) in 200 ml. of anhydrous methanol was slowly treated with a solution of 20.7 g. of sodium (0.9 mole) in 250 ml. of methanol added dropwise over a period of 10 minutes with stirring. The reaction mixture was stirred an additional 3 hours at 56° C. The product was then cooled and methanol distilled off under vacuo. The final temperature of the contents of the flask was 60° C. at 1 mm. Hg. The residue was slurried in 250 ml. of tetrahydrofuran (purified and dried). The slurry was then treated with diborane passed into the flask with the aid of nitrogen from a diborane generator vessel. The diborane was added to the THF slurry of Cr(OCH$_3$)$_3$ under the liquid surface by means of a dip tube while the flask material was stirred vigorously. The diborane was slowly generated by the dropwise addition of 130 g. BF$_3$·etherate (0.9 mole) in 100 ml. of diglyme. The diborane was formed and passed into the Cr(OCH$_3$)$_3$ slurry over a period of 1.5 hours at 15–20° C. with the aid of a stream of nitrogen and the reaction mixture was then stirred an additional 1 hours. The product was filtered to remove the sodium chloride which was then washed twice with THF and all THF solutions combined. Included with the NaCl was a green THF insoluble precipitate. The THF solution was concentrated by blowing with pure nitrogen in a dry box. In this manner, the rest of the green material was obtained free of NaCl. The filtrate was diluted with an equal volume of petroleum ether and kept overnight at −40° C. In this way a good yield of blue crystals (needles) were obtained upon filtration. This blue material could be recrystallized from anhydrous diethyl ether.

EXAMPLE 13.—POLYMERIZATION WITH CHROMIUM COMPLEX

A bomb was charged with 2.0 g. of the blue chromium borohydride crystalline complex and 30 ml. of n-heptane. The bomb was pressured with 500 p.s.i.g. of ethylene at room temperature and rocked for ½ to 1 hour and then heated to 100° C. over a period of 45 minutes and held at this temperature with rocking for 2 hours. After cooling and venting the polymer slurry was first treated with methanol and filtered. The solid polymer was then washed with methanolic HCl, water washed, methanol washed and dried. It had a molecular weight of 217,000 and inherent viscosity of 2.57 (in Decalin at 135° C.).

A repeat run gave a polymer of molecular weight 144,000.

EXAMPLE 14.—POLYMERIZATION WITH CHROMIUM COMPLEX

A similar run as Example 14 was carried out in tetrahydrofuran as the polymerization diluent and a solid polyethylene of 650,000 molecular weight was obtained.

Transition metal alkoxy borohydride complexes such at titanium alkoxy diborohydride-THF complexes are also catalytically active in olefin polymerization and dimerization.

The complexes of this invention are stable as contrasted to the uncomplexed transition metal borohydrides.

The advantages of this invention will thus be apparent to those skilled in the art. A wide variety of novel catalysts of improved storage stabiilty is made available and much greater flexibility in product preparation thereby obtained.

It is to be understood that this invention is not limited to the specific examples which have been offered merely as illustrations and that modifications may be made without departing from the spirit of the invention.

What is claimed is:

1. A method of polymerizing an alpha olefin which comprises contacting the alpha olefin with a catalyst of a titanium borohydride complex, said borohydride complexed with hexamethylphosphoramide.

2. A method of polymerizing an alpha olefin which comprises contacting the alpha olefin with a catalyst of a titanium borohydride complex, said borohydride complexed with phosphorus tributyl.

3. A method of polymerizing an alpha olefin which comprises contacting the alpha olefin with a catalyst of a titanium borohydride complex, said borohydride complexed with antimony tributyl.

4. A method of polymerizing an alpha olefin which comprises contacting the alpha olefin with a catalyst of a titanium borohydride complex, said borohydride complexed with bismuth tributyl.

5. A method of polymerizing an alpha olefin which comprises contacting the alpha olefin with a catalyst of a vanadium borohydride complex, said borohydride complexed with hexamethylphosphoramide.

6. A method of polymerizing ethylene which comprises contacting the ethylene with a catalyst of a titanium borohydride complex, said borohydride complexed with hexamethylphosphoramide.

7. A method of polymerizing propylene which comprises contacting propylene with a catalyst of a titanium borohydride complex, said borohydride complexed with antimony tributyl.

8. A method of polymerizing an alpha olefin which comprises contacting the alpha olefin with a catalyst of a titanium borohydride complex, said titanium borohydride complexed with 1,4-dioxane.

9. A method of dimerizing an olefin which comprises contacting the olefin with a catalyst of a titanium borohydride complex and an aluminum alkyl compound at a temperature below the decomposition point of the titanium borohydride complex, the said titanium borohydride being complexed with a compound containing an element selected from the group consisting of elements of Groups V–A and VI–A of the Periodic Table.

10. A method of polymerizing an alpha olefin which comprises contacting the alpha olefin with a catalyst of a transition metal borohydride complex activated with an aluminum alkyl compound, wherein the transition metal is selected from the group consisting of metals of Groups IV, V, and VI–B of the Periodic Table and the transition metal borohydride is complexed with a compound selected from the group consisting of tetrahydrofuran, 1,4-dioxane, hexamethylphosphoramide, and lower alkyl substituted phosphorous, arsenic, antimony and bismuth compounds.

11. A method of polymerizing an alpha olefin which comprises contacting the alpha olefin with a catalyst of a transition metal borohydride complex activated with an aluminum alkyl compound, said aluminum alkyl compound having the formula RR'AlX, wherein R and R' are alkyl groups having from 2 to 8 carbon atoms and X is selected from the group consisting of a hydrogen atom, a halogen atom, and an alkyl group having from 2 to 8 carbon atoms, the said transition metal is selected from the group consisting of metals of Groups IV, V, and VI–B of the Periodic Table, and the transition metal borohydride is complexed with a compound selected from the group consisting of tetrahydrofuran, 1,4-dioxane, hexamethylphosphoramide, and lower alkyl substituted phosphorous, arsenic, antimony, and bismuth compounds.

12. The method of claim 10 wherein said aluminum alkyl is triethyl aluminum.

13. The method of claim 11 wherein carbon tetrachloride is additionally utilized in said catalyst system.

14. The method of claim 11 wherein said alpha olefin is an olefin having from 2 to 3 carbon atoms.

References Cited by the Examiner
UNITED STATES PATENTS

| | | | |
|---|---|---|---|
| 2,840,551 | 6/1958 | Field et al. | 260—93.7 |
| 2,913,446 | 11/1959 | Cull et al. | 260—94.9 |
| 3,082,197 | 3/1963 | Witt | 260—93.7 |

JOSEPH L. SCHOFER, *Primary Examiner.*

M. LIEBMAN, F. L. DENSON, S. ASTOR,
*Assistant Examiners.*